United States Patent [19]

Conger et al.

[11] 3,935,050

[45] Jan. 27, 1976

[54] METHOD OF MAKING A FUEL CELL

[75] Inventors: Marvin T. Conger, Akron; Theodore A. Evans, Uniontown; Herbert F. Villemain, Cuyahoga Falls, all of Ohio

[73] Assignee: The Goodyear Tire & Rubber Company, Akron, Ohio

[22] Filed: Sept. 13, 1973

[21] Appl. No.: 396,957

[52] U.S. Cl............... 156/242; 156/333; 244/135 B
[51] Int. Cl.$^2$............................................ B29C 1/14
[58] Field of Search .......... 156/242, 155, 184, 189, 156/191, 333; 161/189, 227; 244/135 B; 280/5 R, 5 G

[56] References Cited
UNITED STATES PATENTS

| | | | |
|---|---|---|---|
| 1,662,018 | 3/1928 | Orman | 156/189 |
| 2,558,807 | 7/1951 | Bailey | 156/242 |
| 3,155,133 | 11/1964 | DelaClergerie | 156/191 |
| 3,526,572 | 9/1970 | Finelli | 280/5 R |
| 3,577,314 | 5/1971 | Evans et al. | 161/189 |
| 3,627,624 | 12/1971 | Kreuz et al. | 156/333 |
| 3,656,530 | 4/1972 | Evans et al. | 244/135 B |
| 3,755,040 | 8/1973 | Robinson | 156/242 |

*Primary Examiner*—Caleb Weston
*Attorney, Agent, or Firm*—F. W. Brunner; J. D. Wolfe

[57] ABSTRACT

A method of building an elastomeric fabric container by building an innerliner on a building form, applying a solvent solution of fluorocarbon elastomer over the innerliner and laying up fabric over the cement coat while the cement is sufficiently fluid to strike through the fabric to give at least one layer of fabric covered with at least one coat of fluorocarbon elastomer and curing the elastomer to give a finished container.

2 Claims, No Drawings

METHOD OF MAKING A FUEL CELL

This invention relates to the improvement in the method of construction of high temperature elastomeric fabric containers. More particularly, this invention relates to fluorocarbon elastomeric fabric containers.

U.S. Pat. No. 3,577,314 describes the problems associated with producing high temperature resistant fuel containers and discloses an excellent solution to these problems utilizing fluorocarbon elastomers and polyamide fabric. Unfortunately, the method of construction described is timeconsuming and difficulties are experienced with voids and bubbles being formed in the seam areas and adjacent fabric and elastomer as well as leakage at the seams.

An object of this invention is to provide a method of construction which reduces difficulty with voids and air bubbles in the seam area and in the area adjacent the fabric elastomer.

This object and other advantages of this invention can be obtained by laying the fabric up and pressing into the wet elastomeric coating on the building form to obtain the number of desired plies and then curing the completed assembly.

The nature of this invention can be more readily illustrated by the following representative example where all parts are by weight unless otherwise indicated.

A rectangular plaster of paris building form essentially one foot on each side with a sugar release coat was sprayed with a fluorocarbon elastomeric cement of the type described hereinafter to give a coating one to 150 mils thick, depending on the nature of the container, but preferably 10 to 30 mils thick.

Plies of square woven polyamide fiber, eight ounces per square yard weight and untreated (griege type) was wet in a methyl ethyl ketone bath and laid up over the fluorocarbon elastomer coating before it becomes dry to the touch. The laid-up plies were pressed down to remove occluded air, seamed together with cement and allowed to air dry to give a fabric cover over the form. Then the fabric was spray coated with the cement to give a finished container. The fitting openings were cut therein and fittings cemented into the opening to give a finished container after curing 60 minutes at 300°F., in an autoclave with 85 p.s.i. back-up pressure.

This fluorocarbon elastomer, Viton B[1], 100 parts, was compounded according to the recipe of Table 1:

Table 1

| Compounded Recipe | |
|---|---|
| Ingredients: | Parts |
| Viton B | 100 |
| Magnesium oxide | 15 |
| N,N'-dicinnamylidene-1,6-hexane diamine | 2.0 |
| Red iron oxide | 7.0 |

1.- A commercial elastomeric terpolymer of vinylidene fluoride, hexafluoropropylene and tetrafluoroethylene available from duPont deNemours & Company.

The compounded fluorocarbon elastomer was dissolved in sufficient methyl ethyl ketone (MEK) to give a cement of 15 percent solids. This cement was used to coat the building form above by spraying.

The cured container was filled with water and allowed to stand overnight to soften the plaster of paris. The water and plaster of paris was removed through the fitting opening to give a container free of voids and air bubbles and capable of passing the qualification test for fuel containers as specified by Mil-T-25783D specification.

In another embodiment, a one foot cube building form available from Mandrels, Inc. under the tradename Ultra-Cal cube forms was used. Since regular pottery plaster was used in construction of Ultra-Cal forms, they are porous in nature. The porosity was eliminated by applying a smooth coat of regular plaster to seal the pores and an aqueous sugar solution was applied to provide a release coat for the form.

Sufficient of the compounded Viton of Table 1 was dissolved in a blend of 50 percent methyl ethyl ketone, 24 percent cyclohexanone, 20 percent Butanol and 10 percent N-methyl pyrrolidone to give a 15 percent solution or cement. This solution was spray applied to the one-foot sealed Ultra-Cal cube in several applications to give a coating 12 mils thick when dried to touch. Usually 10 to 15 minutes was allowed between spray coats. This general coating on the cube will hereinafter be referred to as the inner liner.

Over the inner liner a coat of the cement was applied to give a wet coat over the inner liner of 0.5 to 3 mils. The exposed face of the cube was covered with a high temperature polyamide, Nomex fabric, code 9267, (trademark of E. I. duPont deNemours & Company) panels approximately 10 inches by 16 inches. Each panel was laid into the wet cement coat on the inner liner and pressed into the cement with a cotton swab until signs that the solvent was striking through the panel was observed due to color change of the panel, viz. the panel appeared wet.

Then the cube was rotated to expose a different face and panels were then applied to the newly exposed face, as described above, to give a cube fully enclosed in fabric.

If more than a single ply thickness is desired or needed, they can be applied in the same manner as the first panel. Then the last ply is covered with one or more spray coats of the above cement to give a decorative and/or protective coat to the finished container and also to give a container of the desired thickness and strength.

It is preferred that the finished cell dry at room temperature for several hours and then be cured at elevated temperatures where the temperature is raised 25° to 50°F. per hour until a temperature of 400° to 450°F. is reached. This temperature is maintained 20 to 30 hours before cooling the heat cured cell and removing the building form by the normal water soak method to give a finished cell ready for use.

Fuel cells made as described above were pressurized with 10 pounds per square inch of air and tested for leaks with soapy water and found to be free of leaks. Likewise, these fuel cells were filled with fuel and pressurized with air and let stand and did not exhibit any sign of leaking.

This method of making fuel cells or containers can be readily used with the fluorocarbon elastomers and fabric described in U.S. Pat. No. 3,577,314.

Although the cement has for convenience been described as spray applied, it can be applied by brushing, scrubbing, dipping and related well known methods.

While certain representative embodiments and details have been shown for the purpose of illustrating the invention, it will be apparent to those skilled in this art that various changes and modifications may be made therein without departing from the spirit or scope of the invention.

What is claimed is:
1. A method of building an elastomeric fabric container comprising building a fluorocarbon elastomeric inner liner on a building form, applying a solvent solution of a fluorocarbon elastomer coating over the inner liner and laying up fabric over the coating while the coating is sufficiently fluid to strike through the fabric, to give at least one layer of fabric, covering the fabric with at least one coat of a fluorocarbon elastomer and curing the elastomer to give a finished container after removal of the building form.

2. The method of claim 1 wherein the fabric is wet with methyl ethyl ketone and laid up over the coating.

* * * * *